C. H. SMOOT & H. HERTZ.
COLLECTOR RING AND CLAMPING PLATE.
APPLICATION FILED JAN. 2, 1906.
911,081.
Patented Feb. 2, 1909.
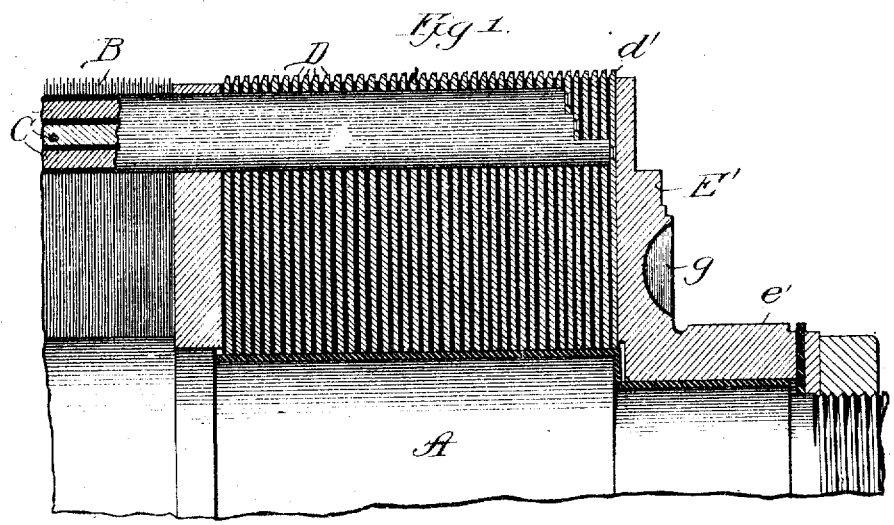
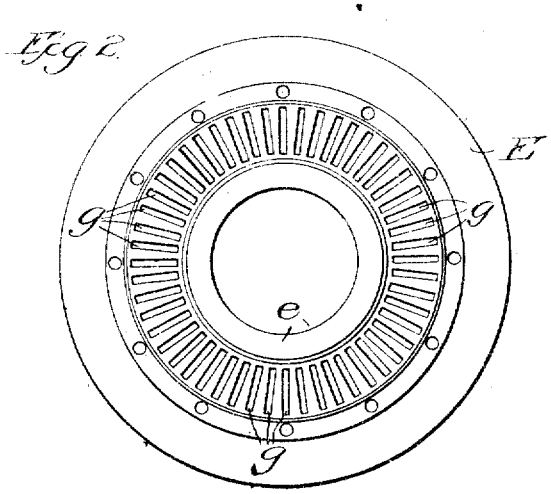
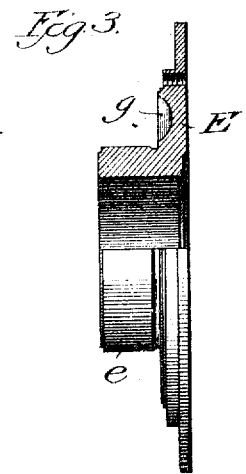
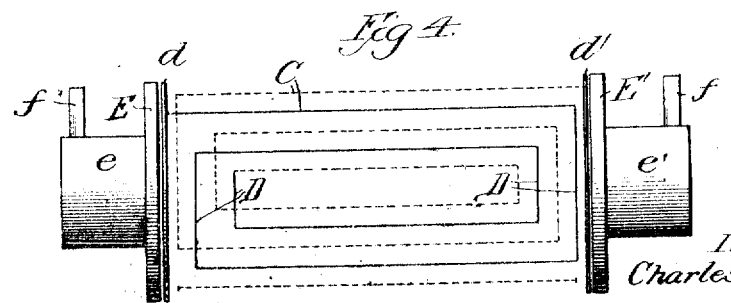
Witnesses:
Inventors:
Charles H. Smoot,
Hjalmar Hertz.
By Barton
Attys.

UNITED STATES PATENT OFFICE.

CHARLES H. SMOOT AND HJALMAR HERTZ, OF CHICAGO, ILLINOIS, ASSIGNORS TO WESTERN ELECTRIC COMPANY, OF CHICAGO, ILLINOIS, A CORPORATION OF ILLINOIS.

COLLECTOR-RING AND CLAMPING-PLATE.

No. 911,081.　　　　Specification of Letters Patent.　　　Patented Feb. 2, 1909.

Application filed January 2, 1906. Serial No. 294,045.

*To all whom it may concern:*

Be it known that we, CHARLES H. SMOOT and HJALMAR HERTZ, citizens of the United States, residing at Chicago, in the county of Cook and State of Illinois, have invented a certain new and useful Improvement in Collector-Rings and Clamping-Plates, of which the following is a full, clear, concise, and exact description.

Our invention relates to a rotor for dynamo-electric machines, and is applicable more particularly to rotating field magnets of alternating current generators of the high speed type.

The object of our invention is to provide a simple and compact structure possessing the requisite strength to withstand the strain to which high speed rotors are subjected.

In our invention clamping plates at the end of the rotor constitute terminals for the field winding, and also provide a contact surface for the collector brushes. In carrying out our invention we preferably provide a rotor with an iron core built up of disks mounted on a shaft, the conductors being heavy metallic bars embedded therein. The end connections between the several conductors are formed by disks assembled upon the shaft at the ends of the core, said disks being insulated from each other and from all the conductors except those to which they are immediately connected. Such a construction is described in detail in an application of Charles H. Smoot, Serial No. 294,044 filed January 2, 1906.

Our invention may be more readily understood by reference to the accompanying drawings, in which—

Figure 1 is a fragmentary longitudinal section of a rotor embodying our invention, showing three conductors in each slot of the core; Fig. 2 is an end elevation of a clamping plate; Fig. 3 is a detail side elevation, partly in section, of a clamping plate forming the ends of the cylindrical portion of the rotor; and Fig. 4 is a simplified diagram illustrating a method of winding which may be employed, and for sake of clearness showing a winding in which only one conductor is placed in each slot of the rotor.

Similar letters of reference refer to similar parts throughout the several views.

Upon the shaft A of the rotary member is mounted a core B. The conductors C of the field winding are embedded in this core near its surface, extending longitudinally thereof in slots of a size to receive said conductors. Said core is of a well known construction, being built up of a series of soft iron laminæ or disks. There may be one or more conductors in each slot, as may be deemed desirable.

At each end of the cylindrical core B are a number of disks D insulated from the core and from each other. These disks are assembled upon the shaft of the rotor at each end of the core and are held in place by clamping plates E and E'. Each clamping plate may be held in position on the shaft A by means of a clamping nut F, as shown in Fig. 1. All of these disks except the two at the extreme end of the rotor, designated *d, d'*, are provided with slots for the purpose of receiving such of the conductors as extend therethrough. Each conductor is insulated from all the disks except the one at each end to which it is riveted or otherwise secured. Electrical connection is made from one conductor to the next through a disk, the conductors being thus arranged in series with each other. The windings finally terminate in the outermost disks *d* and *d'* at the ends of the rotor. Clamping disks or plates E and E' are assembled upon the shaft of the rotor outside the terminal disks *d* and *d'*, and make contact respectively with said terminal disks. The end plates E and E' are each provided with a hub or ring *e* and *e'* respectively, forming surfaces upon which the collector brushes *f* and *f'* are adapted to bear to convey current to and from the winding. In order to more readily radiate heat, the clamping plates E and E' may be provided with radial grooves *g, g*, on their outer faces.

While the particular method of winding constitutes no part of our present invention, we preferably employ that shown in the application of Hjalmar Hertz, Serial No. 294,046, filed January 2, 1906, in which a balanced and symmetrical structure is provided.

Having thus described our invention, we claim:

1. In a dynamo-electric machine, the combination with a rotating field magnet and its winding, of end disks forming the terminals of said field winding and clamping plates having electrical connection with said terminal disks and providing a contact surface for collector brushes.

2. A rotor for dynamo-electric machines comprising a cylindrical core, conductors extending longitudinally of the core, cylindrical end members composed of disks for connecting said conductors in series, the external disks forming the terminals of the series, and clamping plates abutting against said external disks and provided with contact surfaces for collector brushes.

3. In a rotor for dynamo-electric machines a cylindrical core, a series of conductors extending longitudinally of the core, connector disks for connecting said conductors in series, the external disks forming the terminals of the series of conductors, clamping plates abutting against said external disks, and collector rings formed integral with said clamping plates.

4. In a turbo-generator, the combination with a rotating field magnet, of end disks forming the terminals of the field winding, end clamping plates having electrical connection with said terminals, said plates having radial grooves on their outer faces, and collector rings integral with said clamping plates.

5. A rotor for dynamo-electric machines comprising a laminated core, a winding for said core made up of longitudinal bars, and connector disks at the end of the core uniting said bars in series to form a field winding, and heavy clamping rings outside said connector disks at opposite ends of the rotor, having contact surfaces for brushes, said rings forming the electrical terminals of said winding.

In witness whereof, we hereunto subscribe our names this 26th day of December, A. D., 1905.

CHARLES H. SMOOT.
HJALMAR HERTZ.

Witnesses:
GEORGE E. FOLK,
HENRY H. WAIT.